Jan. 9, 1945.  W. F. WENDE  2,366,820
BOMB HANDLING DEVICE
Filed July 15, 1942  3 Sheets-Sheet 1
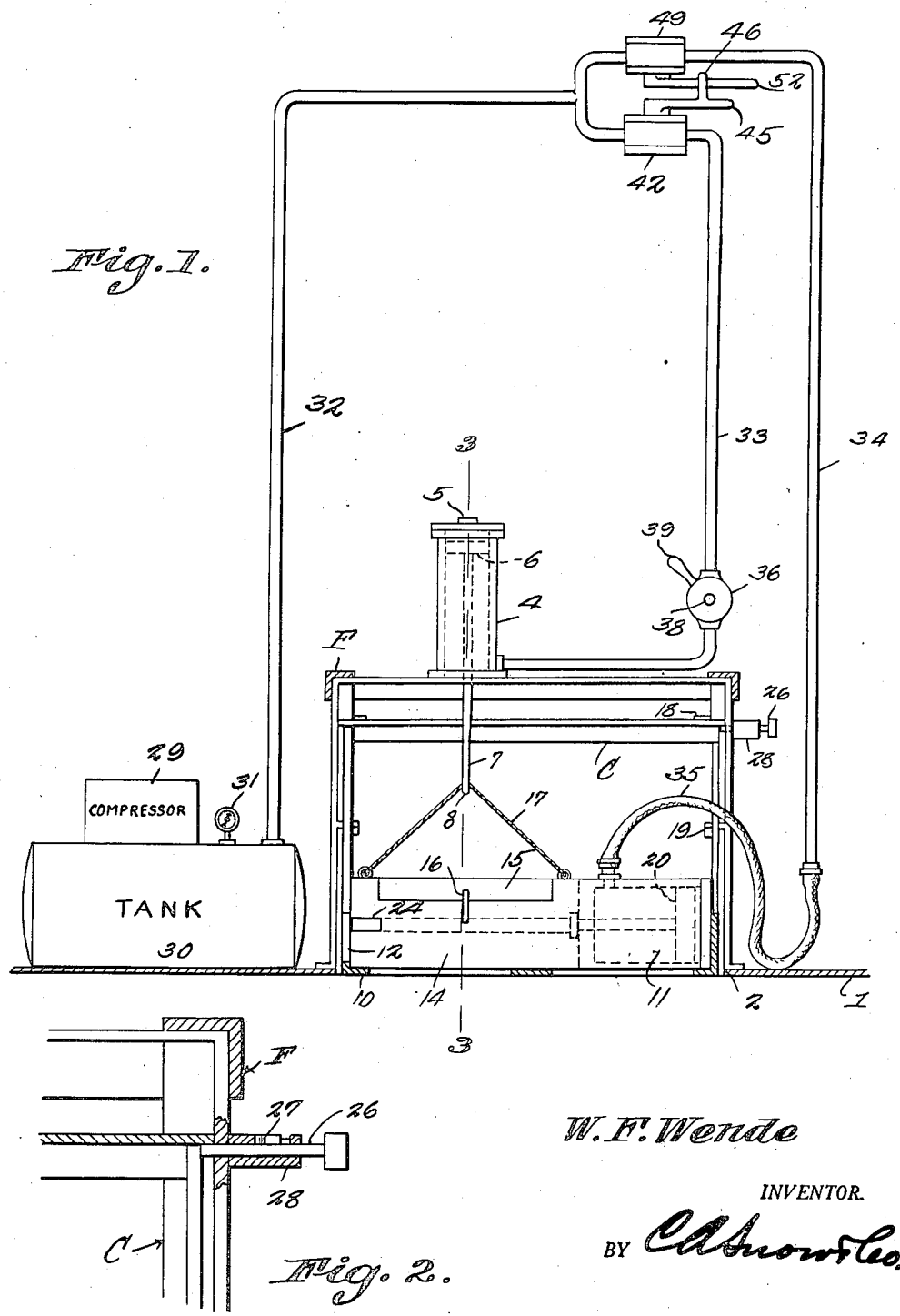

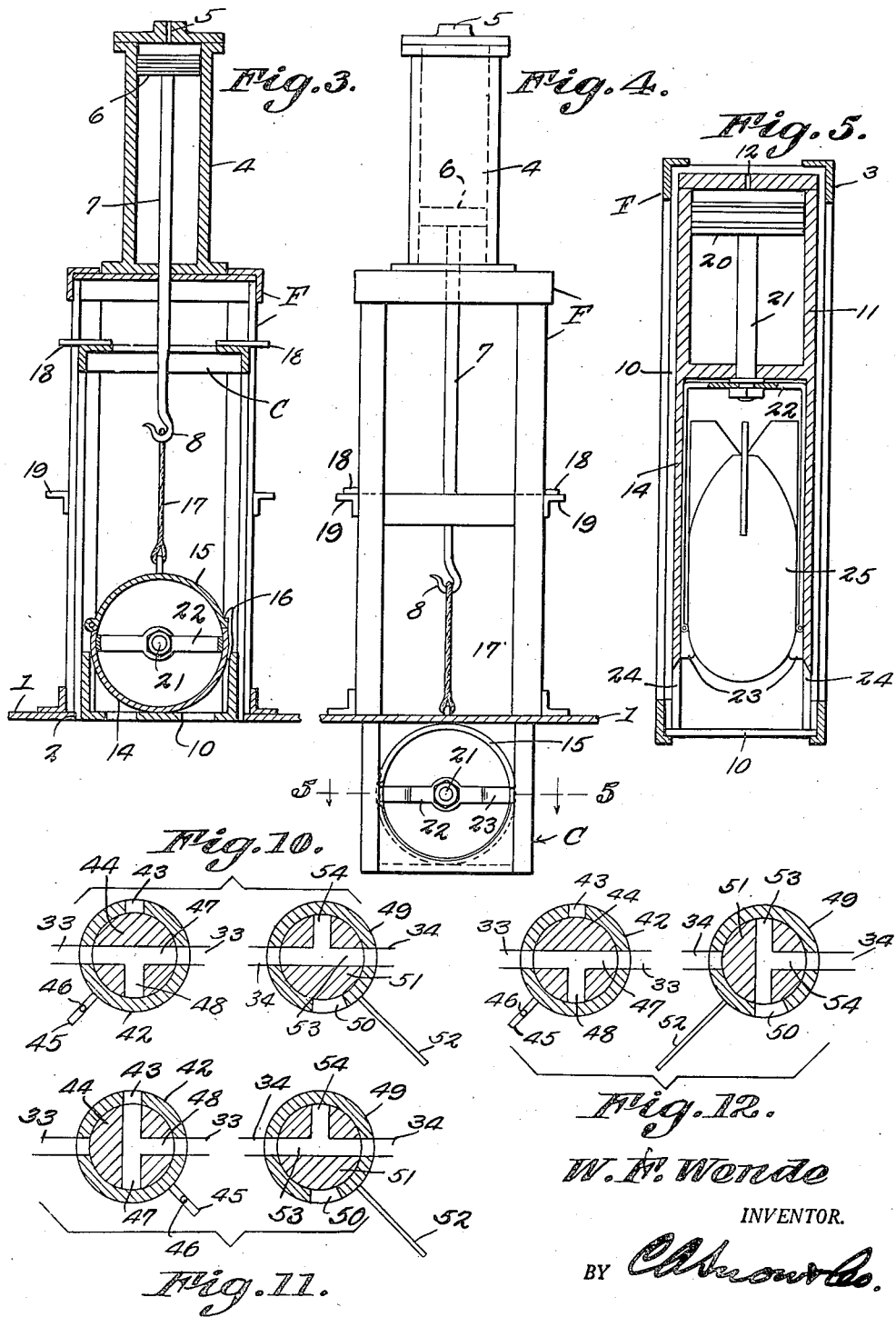

Jan. 9, 1945.   W. F. WENDE   2,366,820
BOMB HANDLING DEVICE
Filed July 15, 1942   3 Sheets-Sheet 3
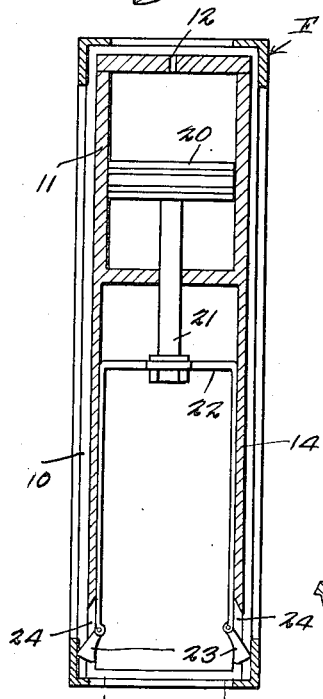
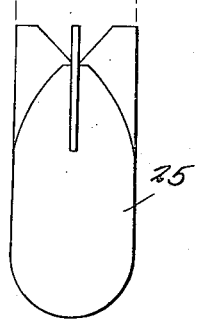
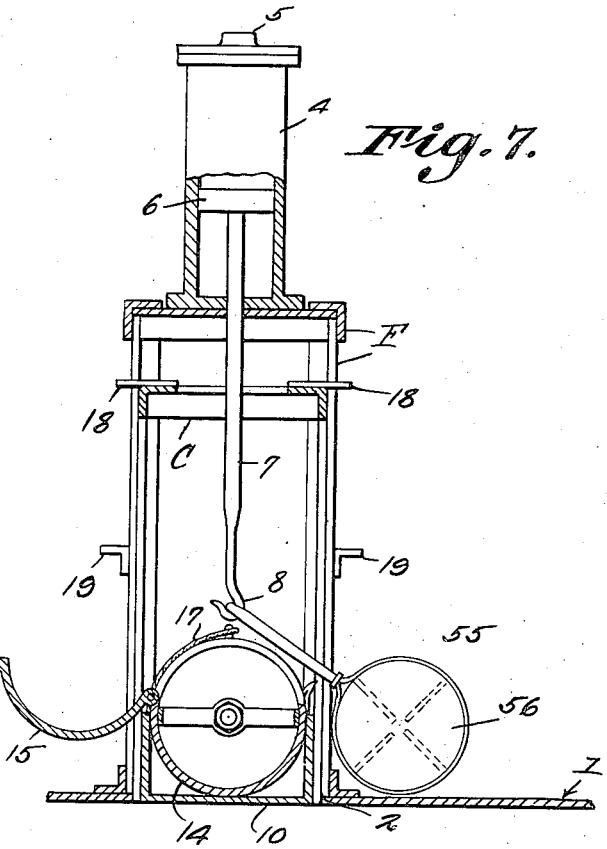
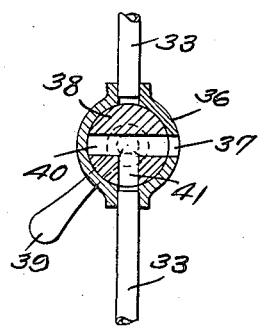
W. F. Wende
INVENTOR.

Patented Jan. 9, 1945

2,366,820

UNITED STATES PATENT OFFICE 2,366,820

BOMB HANDLING DEVICE

William F. Wende, Buffalo, N. Y.

Application July 15, 1942, Serial No. 451,062

2 Claims. (Cl. 89—1.5)

This invention aims to provide novel means for mounting a bomb-carrier in housed position within an aircraft, the construction being such that the carrier may be lowered below the body of the aircraft, the bomb being released from the carrier, to permit the bomb to move parallel to the line of flight of the aircraft when the aircraft makes a vertical nose-dive. In other words, in order to make an accurate placement of the bomb with respect to its objective, it is necessary merely to point the aircraft vertically down toward the objective, and release the bomb, distinguished from an accurate establishment of a line of flight for the bomb itself. The construction is such that a bomb may be placed accurately on a target without taking into consideration those horizontally-acting factors which promote inaccuracy of bomb-deposit if the aircraft is moving otherwise than in a vertical nose-dive.

Another object of the invention is to provide novel means for operating the carriage, and for releasing the bomb.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in side elevation, a bomb handling device constructed in accordance with the invention;

Fig. 2 is a sectional view showing one of the latches employed to hold the bomb carriage elevated;

Fig. 3 is a section on the line 3—3 of Fig. 1;

Fig. 4 is an end elevation of the structure depicted in Fig. 3, the bomb carriage being lowered;

Fig. 5 is a section on the line 5—5 of Fig. 4, the view depicting the bomb carriage and associated parts in a vertical position, whilst the aircraft is making a vertical nose-dive, and just prior to the release of the bomb;

Fig. 6 is a view similar to Fig. 5, but disclosing the parts as they will appear after the bomb has been dropped;

Fig. 7 is a transverse section, the bomb carriage being opened, for the reception of a bomb;

Figs. 8 and 9 are sectional elevations, showing the different positions of a valve which is under the control of the attendant;

Figs. 10, 11 and 12 are diagrammatic sectional views illustrating the operation of valves other than the one shown in Figs. 8 and 9.

Although the device hereinafter described is intended to function, primarily, when the aircraft is making a vertical nose-dive, it will be assumed that it is on a horizontal line of flight, to the end that such terms as forward, rear, above, below, vertical, horizontal and the like, may have a determined meaning in locating parts relatively to each other and in describing movements.

The numeral 1 marks the floor of an aircraft, such as an airplane, the floor having an opening 2, indicated in Fig. 3. A rectangular, horizontally elongated guide frame F is secured to the floor 1, about the opening 2, in upstanding relation with respect thereto. A vertical cylinder 4 is carried by the upper portion of the guide frame F, and has a top vent 5, a piston 6 being mounted for reciprocation in the cylinder, the piston being connected to a rod 7, supplied at its lower end with a connecting element 8, such as a hook.

A rectangular, horizontally elongated bomb-carrier C is mounted for vertical reciprocation in the guide frame F and includes a trough-like base 10 in which is secured a horizontal, lower or first cylinder 11, having a vent 12 in its rear end, the cylinder merging into a tubular, forwardly presented cradle 14, carrying a hinged lid 15, held closed, releasably, by a latch 16 on the cradle. A flexible bridle 17 is secured at its ends to the upper part of the cradle 14, at opposite ends of the lid 15, and is adapted to be engaged, releasably, with the hook 8 on the piston rod 7. Downward movement of the bomb-carrier C is limited by outstanding fingers 18 on the carrier, the fingers being adapted to engage stops 19 on the guide frame F.

A first piston 20 is mounted for reciprocation in the first cylinder 11 and is secured to a rod 21, a U-shaped bomb grip 22 having its intermediate portion secured to the rod. The side arms of the bomb grip 22 are disposed within the cradle 14, longitudinally thereof, as shown in Fig. 5, rearwardly tapered jaws 23 having their rear ends pivoted to the forward portions of the bomb grip, the jaws being adapted, under conditions hereinafter pointed out, to retire outwardly through oppositely disposed openings 24 in the cradle 14. When the jaws 23 are disposed within the cradle 14, as in Fig. 5, and when the cradle has been retracted, the jaws hold a bomb 25 in the cradle.

Figure 2 shows that a transverse guide 28 is mounted on the frame F, a latch 26 being mounted for reciprocation in the guide. The latch 26 is held advanced, to engage underneath the upper part of the carrier C, by means of a pin and bayonet slot structure 27, carried by the guard 28 and by the latch 26. The releasably interengaged parts comprising the latch 26 and the upper part of the carrier C, hold the carrier C elevated at the will of an operator, under conditions which will be pointed out hereinafter. Until notice is given to the contrary, let it be supposed that the latch 26 is out of engagement with the carrier C.

An air compressor 29 is supported on any accessible portion of the airplane and it discharges into a storage tank 30 on the plane, the tank being supplied with a pressure indicating gage 31. A supply pipe or conduit 32 is connected to the air storage tank 30 and includes branches 33 and 34, the branch 33 leading to the cylinder 4 and discharging beneath the piston 5, the branch 34 leading to the cylinder 11, in advance of the piston 20, the branch 34 comprising a flexible part 35, connected to the cylinder 11, the part 35 being flexible, since the bomb-carrier C is adapted to move up and down in the guide frame F.

A valve casing 36 is interposed in the branch 33 and has an exhaust port 37. A valve 38 is mounted to rotate in the casing 36 and is operated by a handle 39. The valve 38 has a transverse passage 40 extended entirely therethrough, the valve having a passage 41, at right angles to the passage 40 and communicating at its inner end with the passage 40. When the parts are in the position of Fig. 8, the exhaust port 37 is closed, and the branch 33 is open, by way of the passage 40. When the parts are in the positions of Fig. 9, the branch 33 is closed from the valve 38 backwardly to the tank 30, but is open from the valve to the cylinder 4. The cylinder 4 then can be exhausted through the part of the branch 33 that lies between the valve 36 and the cylinder 4, the exhaust moving through the passage 41, the passage 40, and the exhaust port 37. The valve 38 is so located that it can be operated by an attendant in the plane.

A valve casing 42 is interposed in the branch 33 and has an exhaust port 43. A valve 44 is mounted to rotate in the casing 42, and is operated by a short handle 45 having a transverse finger 46. The valve 44 has a passage 47 extended entirely therethrough, and has a passage 48, at right angles to the passage 47, and communicating at its inner end therewith.

When the valve 44 is in the position shown in Fig. 10, air under pressure can flow from the conduit 32, through the branch 33, by way of the passage 47, and through the valve 38 of Fig. 8, to the cylinder 4.

When the valve 44 is in the position of Fig. 11, the exhaust port 43 is opened, from the position of Fig. 10, the conduit 32 and the adjacent portion of the branch 33 are closed, and an exhaust line for the cylinder 4 is created, through the lower portion of the branch 33, in Fig. 1, the valve 38 (in the position of Fig. 8), the intermediate portion of the branch 33, the passage 48, the passage 47, and the port 43.

A valve casing 49 is interposed in the first conduit 34 and has exhaust port 50. For a reason to be explained hereinafter, the exhaust port 50 is longer, circumferentially of the casing 49, than is the exhaust port 43, considered relatively to the casing 42. A valve 51 is mounted to rotate in the casing 49 and is manipulated by a long handle 52. The finger 46 on the handle 45 extends across the handle 52. The handles 45 and 52 are so located on the plane that they can be worked by the pilot, if desired. The valve 51 has a passage 53, corresponding to the passage 47 of the valve 44, and it has a passage 54, corresponding to the passage 48.

When the valve 51 is in the position of Fig. 10, the exhaust port 50 is closed, and air under pressure can move from the conduit 32, through the branch 34, by way of the passage 53, and through the flexible part 35 of the branch, to the cylinder 11.

In Fig. 11, the valve 51 is shown in the same position as in Fig. 10, Figure 11 having reference to a different operating step from that to which Fig. 10 relates.

In Fig. 12, the valve 44 occupies the position shown in Fig. 10, but the valve 51 is so disposed that the portion of the branch 34 that lies between the casing 49 and the conduit 32 is closed, the passage 53 being in communication with the exhaust port 50, and an exhaust line for the cylinder 11 being created, by way of the part 35 of the conduit 34, the portion of the conduit 34 that extends to the casing 49, the valve passage 54, the valve passage 53, and the port 50.

Suppose that the valve 38 is in the position of Fig. 8, and that the valves 44 and 51 are in the position of Fig. 10. Then air passes from the tank 30, through the conduit 32, and through the branches 33 and 34—35, to the second cylinder 4 and to the first cylinder 11. The second piston 6 is raised as in Fig. 3, elevating the piston rod 7, the hook 8 and the bridle 17, maintaining the bomb-carrier C in the elevated position of Fig. 1, the bomb-carrier being housed completely within the body of the airplane.

Air flows from the pipe 32, through the conduit 34—35, by way of the valve passage 53, to the cylinder 11, in front of the piston 20, the piston rod 21 retracting the grip 22, so that the jaws 23 hold the bomb 25 in the cradle 14.

The next step comprises lowering the cradle 14 to the position of Fig. 4. Assuming that the parts are in the position shown in Figs. 1 and 10, the operator rotates the valve 44 to the position of Fig. 11, by way of the handle 45. The cylinder 4 exhausts through the passages 48 and 47 of Fig. 11, and through the port 43, the carrier C moving downwardly to the position of Fig. 4, the parts 18 on the carrier C coming into contact with the stops 19 on the guide frame F, to limit the downward movement of the frame. The valve 51 maintains the position of Fig. 10. There is still pressure on the piston 20, and the bomb 25 is still in the cradle 14.

The airplane makes a nose-dive, vertically, and the cradle 14 and associated parts assume the vertical position of Fig. 5. It is now desirable to release the bomb 25, for downward movement upon the objective. This is accomplished by rotating the valve 51, by means of the handle 52 to the position of Fig. 12, the cylinders 11 being exhausted through the conduit 35—34, the passage 54, the passage 53 and the port 50.

Recalling that the bomb-carrier C and the bomb 25 are in the vertical position of Fig. 5, the bomb-carrier gravitates to the position of Fig. 6. At this time, the jaws 23 on the grip 22 swing outwardly into the openings 24 in the cradle 14, under transverse pressure exerted by the bomb 25, and the bomb is released and moves downwardly, as in Fig. 6.

Reverting to Fig. 12, it will be seen that when the operating means 52 of the valve 51 assumes the position depicted in that figure, the operating means engages the finger 46 on the operating means 45 of the valve 44 and rotates the valve 44 until it is in the position of Fig. 12, and until communication with the tank 30 is established, by way of the conduit 32, the branch 33 and the passageway 47, with the cylinder 4. There is now pressure through the second conduit 33 and in the cylinder 4, the cradle 14 being raised to the housed position of Fig. 1.

The handle 52 is returned to the position of Fig. 10, the valve 51 being rotated until there is presure in the branch 34, and when there is pressure in that branch, the piston 20 is retracted, to retract the grip 22, so that it may hold another bomb 25, as in Fig. 5.

Noting that the port 50 of the casing 49 is somewhat longer than the port 43 of the casing 42, when the handles 52 and 46 assume the positions of Fig. 12, the port 50 opens a little ahead of the opening of the pressure line through the branch 33 by way of the passage 47. The result is that the piston 20 and associated parts have time to release the projectile 25 of Fig. 5 before the carrier C begins to rise responsive to pressure delivered against the piston 4 through the branch 33 and the passage 47.

Whilst the valves 44 and 51 are in the position of Fig. 10, the attendant, by means of the handle 39, can turn the valve 38 to the position of Fig. 9. This operation cuts off the pressure to the cylinder 4 and permits the cylinder to exhaust. The piston rod 7 moves downwardly, and the bridle 17 is cast off the hook 8, as shown in Fig. 7. The lid 15 is opened. A sling 55 is assembled with a new bomb 56, the sling being connected to the hook 8. The valve 38 is restored to the position of Fig. 8 and pressure is admitted to the cylinder 4. The piston 6 and the rod 7 are raised, elevating the bomb 56 and causing it to swing inwardly.

The valve 38 is moved back to the position of Fig. 9, cutting off the pressure on the cylinder 4, and the piston 6 moves downwardly, the bomb 56 being permitted to settle into the cradle 14. The lid 16 is closed. The sling 55 is detached from the hook 8, and the bridle 17 is connected to the hook. The valve 38 is put back into the position of Fig. 8 thereby causing the piston 6 and the rod 7 to rise and take the slack out of the bridle. During the aforesaid loading operation, the latch 26 is engaged with the carrier C, as in Fig. 2, to prevent it from moving downwardly into the position of Fig. 4.

Having thus described the invention, what is claimed is:

1. In a bomb handling device, an aircraft, a guide mounted on the aircraft, a bomb carrier mounted on the guide for substantially vertical reciprocation when the line of flight is substantially horizontal, a bomb grip mounted on the carrier for reciprocation in a direction substantially at right angles to the direction of reciprocation of the carrier, the grip comprising a part engageable with the carrier, to hold the grip in bomb-gripping condition, means under the control of an operator for lowering the carrier to dispose the grip below the aircraft when the line of flight is substantially horizontal, and for raising the carrier to house it in the aircraft, and means under the control of an operator for holding the grip retracted and in bomb-gripping position, when the aircraft makes a nose-dive, and for advancing the grip into bomb-releasing position.

2. In a bomb-handling device, an aircraft having a bottom provided with an opening, an upstanding guide within the aircraft and secured to the bottom, about the opening, a bomb carrier slidable in the guide, and through the opening, to and from outwardly projecting position with respect to the bottom, a fluid pressure cylinder mounted on top of the guide, a piston structure mounted for reciprocation in the cylinder, a fluid pressure conduit opening into the cylinder below the piston structure, combined inlet and exhaust means interposed in the conduit, the guide being open at one side, close to the bottom, to permit a bomb, resting on the bottom, to be moved to a position within the guide and upon the carrier, a sling constructed for detachable assembly with a bomb positioned as aforesaid, a connecting member on the carrier, a connecting element on the piston structure and shaped for quick engagement with the connecting member on the carrier, when the carrier is to be slid to outwardly projecting position, the connecting element of the piston structure being shaped for quick engagement with the sling, when a bomb is to be moved to a position upon the carrier, and means associated with the guide and with the carrier for holding the carrier elevated, whilst the connecting element of the piston structure is free from the connecting member of the carrier and engaged with the sling.

WILLIAM F. WENDE.